May 28, 1963 D. L. McNALLY 3,091,131
SPACER CAGE
Filed June 27, 1961 2 Sheets-Sheet 1

Donald L. McNally
INVENTOR.

BY *Clarence A. O'Brien*
*and Harvey B. Jacobson*
Attorneys

May 28, 1963   D. L. McNALLY   3,091,131
SPACER CAGE
Filed June 27, 1961   2 Sheets-Sheet 2

Donald L. McNally
INVENTOR.

BY *Clarence A. O'Brien*
*and Harvey B. Jacobson*
Attorneys

United States Patent Office 3,091,131
Patented May 28, 1963

3,091,131
SPACER CAGE
Donald L. McNally, Grantsburg, Wis., assignor to Mc-
Nally Bros. Machine & Gear Company, Inc., Grants-
burg, Wis., a corporation of Wisconsin
Filed June 27, 1961, Ser. No. 119,965
5 Claims. (Cl. 74—606)

This invention relates to a novel and useful spacer cage specifically adapted for miniature size gear trains for use with small control motors where space is a critical factor. The spacer cage of the instant invention is not only designed with minimum space requirements as the primary function but also to provide a spacer cage for rotatably journalling numerous gears of a gear train in a rigidly constructed housing.

The spacer cage of the instant invention is constructed in a manner whereby pins or elongated screws extending through the gear cage and projecting from opposite ends thereof are eliminated. Additionally, the cage is constructed to afford the maximum support for a plurality of gears in a gear train in the smallest compact unit possible.

The main object of this invention is to provide a spacer cage for rotatably mounting a plurality of gears in a gear train in proper orientation relative to each other in a manner whereby the gear train may be assembled in a compact unit.

A further object of this invention, in accordance with the immediately preceding object, is to provide a spacer cage which will afford the required support for numerous gears of a gear train while maintaining the weight of the gear train assembly at a minimum.

A final object to be specifically enumerated herein is to provide a spacer cage in accordance with the preceding objects which will conform to conventional forms of manufacture, be of simple construction and easy to assemble so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
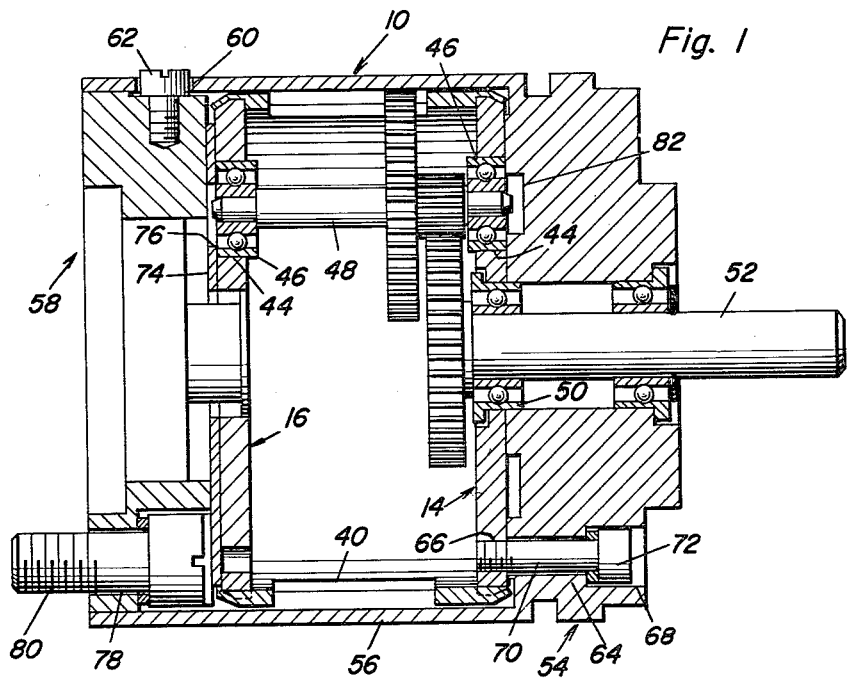
FIGURE 1 is a longitudinal vertical sectional view of the spacer cage of the instant invention shown being utilized to rotatably journal a pair of gears of a gear train, other gears of the gear train being removed.
Figure 2:
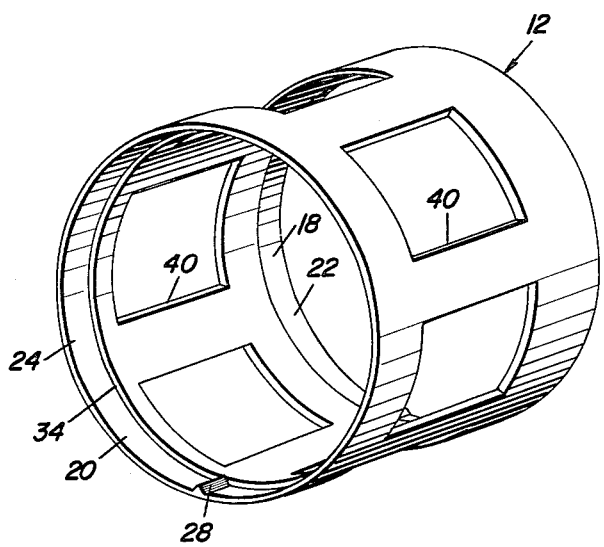
FIGURE 2 is a perspective view of the sleeve of the gear cage utilized to enclose the various gears of the gear train.
Figure 3:
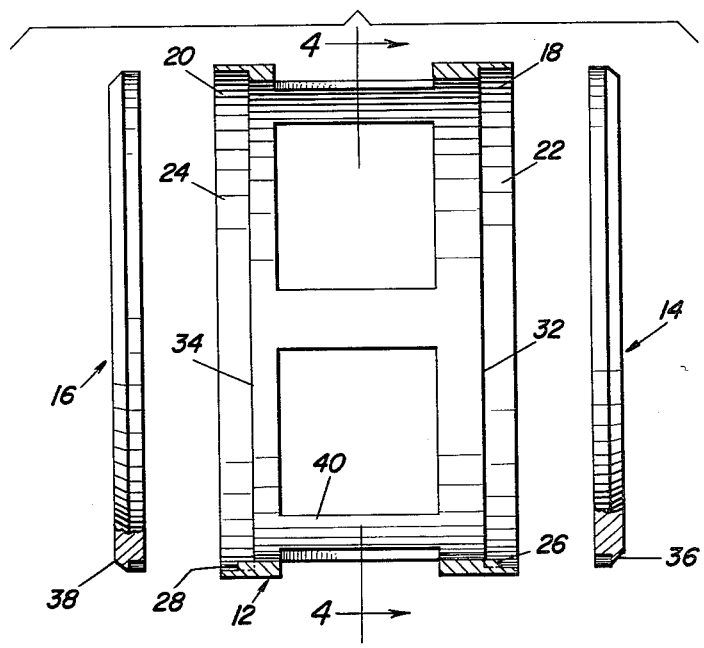
FIGURE 3 is an exploded side elevational view of three components of the gear cage, one of the components being shown in longitudinal vertical section.
Figure 4:
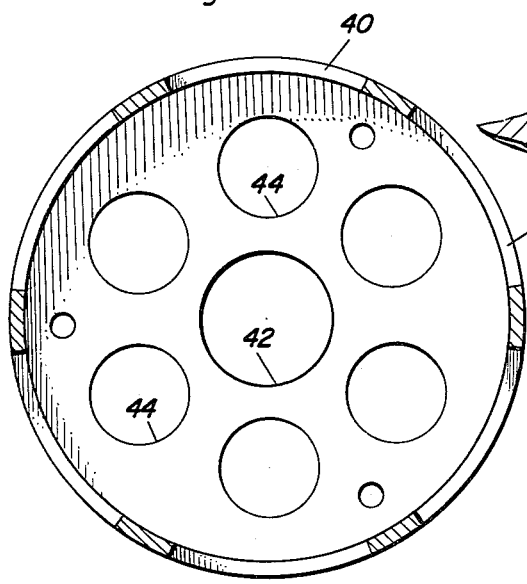
FIGURE 4 is a transverse vertical sectional view taken substantially upon the plane indicated by the section line 4—4 of FIGURE 3.
Figure 5:
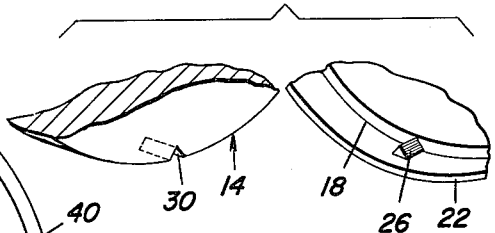
FIGURE 5 is a fragmentary exploded perspective view of one end of the hollow sleeve of the gear cage and an associated end plate.

Referring now more specifically to the drawings the numeral 10 generally designates the gear cage of the instant invention which includes an elongated hollow sleeve member generally referred to by the reference numeral 12 and a pair of opposite end plates 14 and 16. It will be noted that the hollow sleeve 12 includes opposite end diametrically enlarged axially opening seats 18 and 20 which are encircled by thin walled end portions 22 and 24 of the sleeve 12.

It will be noted that the seats 18 and 20 include a pair of axially extending projections 26 and 28 respectively and that the projections 26 and 28 are received within the complementary longitudinal grooves 30 formed in each of the end plates 14 and 16. The end plates 14 and 16 are positioned within the seats 18 and 20 respectively against the annular shoulders 32 and 34 respectively and the thin walled end portions 22 and 24 are inwardly deflected and rolled over the outwardly bevelled outer peripheral edges 36 and 38 of the end plates 14 and 16 respectively thereby maintaining the end plates 14 and 16 captive within the seats 18 and 20 respectively.

The hollow sleeve 12 is provided with a plurality of circumferentially spaced openings 40 and each of the end plates 14 and 16 includes a centrally disposed opening 42 surrounded by circumferentially spaced openings 44.

With attention now directed to FIGURE 1 of the drawings it will be noted that each of the openings 44 may be utilized to properly position a bearing assembly 46 for rotatably journalling the opposite ends of one or more gear shafts 48.

Each of the centrally disposed openings 42 may also be utilized to support a bearing assembly 50 and these bearing assemblies 50 may be utilized to rotatably journal an input shaft 52 and an output shaft (not shown).

With attention again invited to FIGURE 1 of the drawings there will be seen a first end cap generally referred to by the reference numeral 54 which includes a generally marginal and cylindrical wall 56 projecting from the inner side face thereof. The cylindrical wall snugly receives the hollow sleeve 12 and when the end cap 54 has its inner face abutted against the outer surface of the end plate 14, the cylindrical wall 56 extends outwardly beyond the remote end of the sleeve 12. A second end cap generally referred to by the reference numeral 58 is received in the confines of the free end of the cylindrical or marginal wall 56 and it will be noted that the cylindrical wall 56 is provided with openings 60 through which fasteners 62 project and are threadedly engaged with the end cap 58 to rigidly secure the end cap 58 in the end of the cylindrical wall 56 remote from the end cap 54.

The end cap 54 is provided with axially extending bores 64 and the end plate 14 includes a plurality of threaded bores 66 registrable with the bores 64. The bores 64 include outer end counterbores 68 and threaded fasteners 70 have their shank portions inserted through the bores 64 and their head portions 72 received within the counterbores 68. The threaded portions of the shank portions 70 are threadedly engaged in the threaded bores 66 in the end plate 14 in order to secure the end cap 54 to the end plate 14.

It will be noted that the end cap 58 includes a spacer washer or disk 74 which is provided with circumferentially spaced openings 76 registrable with the openings 44 formed in the end plate 16. However, the openings 76 are smaller in diameter than the openings 44 and thus the portions of the disk 74 disposed about the openings 76 act as abutments preventing outward withdrawal of the bearings 46 from within the openings 44. The gear shafts 48 may of course be provided with diametrically enlarged portions inwardly of the bearings 46 in order to prevent inward displacement of the bearings 46 relative to the end plate 16.

It will also be noted from FIGURE 1 of the drawings that the end cap 58 includes a plurality of circumferentially disposed bores 78 which may be utilized to receive large threaded fasteners 80 for securing the end cap 58 to the housing of a given mechanism to be driven by the gear train housed within the spacer cage 10.

Still further, it will be noted that the end cap 54 is also provided with recess means such as that defined by the disk 74 for retaining the associated bearings 46 within the end plate 14. However, the recess means carried by the end cap 54 include axially opening recesses 82 which are smaller in diameter than the corresponding openings 44 formed in the end plate 14.

It will be noted that when the thin walled end portions 22 and 24 are rolled downwardly over the outwardly bevelled outer peripheral edges 36 and 38 of the end plates 14 and 16 respectively that an extremely rigid spacer cage is provided.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A spacer cage for rotatably mounting gears of a gear train in proper orientation relative to each other, said spacer cage comprising an elongated hollow sleeve including opposite end diametrically enlarged axially opening seats defined by encircling opposite thin walled end portions of said sleeve, a pair of opposite end plates seated in said seats and including outwardly bevelled outer peripheral edges, said thin walled end portions being inwardly deflected and enclosing said bevelled outer peripheral edges for maintaining said end plates captive within said seats, said end plates having bearing receiving openings formed therein at predetermined locations, a first end cap for one of said end plates including a generally marginal wall projecting laterally from the inner face of said end cap, said end cap overlying the outer face of said one end plate with said marginal wall encircling said hollow sleeve and projecting beyond the end thereof remote from said first end cap, a second end cap overlying the outer face of the other end plate and at least partially received within the confines of the free end of said marginal wall, means securing said second end cap in the free end of said marginal wall, and means securing said first end cap to said one end plate.

2. The combination of claim 1 wherein said end caps each include means defining inwardly opening recesses registrable with but smaller in diameter than certain ones of said openings formed in said end plates whereby said recesses may provide clearance for the ends of shafts journalled in bearings disposed in said certain openings and the portions of the elements defining said recesses and disposed thereabout may define abutment surfaces preventing outward movement of said bearings through said openings.

3. A spacer cage for rotatably mounting gears of a gear train in proper orientation relative to each other, said spacer cage comprising an elongated hollow sleeve including opposite end diametrically enlarged axially opening seats defined by encircling opposite thin walled end portions of said sleeve, a pair of opposite end plates seated in said seats and including outwardly bevelled outer peripheral edges, said thin walled end portions being inwardly deflected and enclosing said bevelled outer peripheral edges for maintaining said end plates captive within said seats, said end plates having bearing receiving openings formed therein at predetermined locations, said seats and end plates including coacting interlockingly engageable positioning means for maintaining said end plates properly orientated in rotated positions about the longitudinal axis of and relative to said sleeve.

4. A spacer cage for rotatably mounting gears of a gear train in proper orientation relative to each other, said spacer cage comprising an elongated hollow sleeve including opposite end diametrically enlarged axially opening seats defined by encircling opposite thin walled end portions of said sleeve, a pair of opposite end plates seated in said seats and including outwardly bevelled outer peripheral edges, said thin walled end portions being inwardly deflected and enclosing said bevelled outer peripheral edges for maintaining said end plates captive within said seats, said end plates having bearing receiving openings formed therein at predetermined locations, each of said end plates has a centrally disposed opening formed therein for receiving input and output shafts of said gear train, some of said first mentioned openings in each of said end plates being equally circumferentially spaced about the corresponding centrally disposed opening, said sleeve having circumferentially spaced openings formed therein in radial alignment with said some of said openings.

5. The combination of claim 3 wherein each of said end plates has a centrally disposed opening formed therein for receiving input and output shafts of said gear train, and said first mentioned openings in each of said end plates are equally circumferentially spaced about the corresponding centrally disposed opening.

References Cited in the file of this patent

UNITED STATES PATENTS

| | | |
|---|---|---|
| 2,073,348 | Merkle | Mar. 9, 1937 |
| 2,834,225 | Carter et al. | May 13, 1958 |
| 2,883,880 | Merkle | Apr. 28, 1959 |
| 2,936,644 | Miller | May 17, 1960 |
| 2,968,971 | Beadle et al. | Jan. 24, 1961 |